United States Patent
Chen et al.

(10) Patent No.: US 12,138,803 B2
(45) Date of Patent: Nov. 12, 2024

(54) METHOD FOR CONTROLLING LEGGED ROBOT, ROBOT AND COMPUTER-READABLE STORAGE MEDIUM

(71) Applicant: UBTECH ROBOTICS CORP LTD, Shenzhen (CN)

(72) Inventors: Chunyu Chen, Shenzhen (CN); Yizhang Liu, Shenzhen (CN); Ligang Ge, Shenzhen (CN); Jie Bai, Shenzhen (CN); Jiangchen Zhou, Shenzhen (CN); Qiuyue Luo, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 224 days.

(21) Appl. No.: 18/089,588

(22) Filed: Dec. 28, 2022

(65) Prior Publication Data
US 2023/0133934 A1   May 4, 2023

Related U.S. Application Data

(63) Continuation of application No. PCT/CN2021/131466, filed on Nov. 18, 2021.

(30) Foreign Application Priority Data

Jul. 26, 2021 (CN) .......................... 202110846375.X

(51) Int. Cl.
*B25J 9/16* (2006.01)
*B25J 13/08* (2006.01)
*B62D 57/032* (2006.01)

(52) U.S. Cl.
CPC .......... *B25J 9/1666* (2013.01); *B25J 13/085* (2013.01); *B62D 57/032* (2013.01)

(58) Field of Classification Search
CPC ...... B25J 9/1666; B25J 13/085; B25J 9/1676; B25J 9/1661; B25J 9/161; B62D 57/032; G05B 2219/39082
See application file for complete search history.

(56) References Cited

U.S. PATENT DOCUMENTS 11,254,003 B1 *  2/2022 Zhao ..................... G05D 1/0217
2019/0337154 A1 * 11/2019 Holson .................. B25J 9/1697
(Continued)

FOREIGN PATENT DOCUMENTS

CN          110480640 A     11/2019

OTHER PUBLICATIONS

ISR for PCT/CN2021/131466.
Written opinions of ISA for PCT/CN2021/131466.

*Primary Examiner* — Harry Y Oh

(57) ABSTRACT

A method for controlling a legged robot includes: in response to detection of a collision event associated with a foot of a swing leg of the biped robot, terminating a trajectory component planning of the swing leg in a collision direction; calculating a position offset in the collision direction according to an external force that is received by the foot of the swing leg in the collision direction and obtained in real time, based on a foot dragging control mode, and determining a replanned trajectory component in the collision direction based on the position offset; and controlling the swing leg to move based on the replanned trajectory component in the collision direction and a desired trajectory component of the swing leg in a non-collision direction.

20 Claims, 6 Drawing Sheets

(56) References Cited

U.S. PATENT DOCUMENTS

2020/0089252 A1\* 3/2020 Kim ................... B25J 5/007
2020/0242544 A1\* 7/2020 Galluzzo ............. B25J 9/1692

\* cited by examiner

METHOD FOR CONTROLLING LEGGED ROBOT, ROBOT AND COMPUTER-READABLE STORAGE MEDIUM

CROSS REFERENCE TO RELATED APPLICATIONS

The present application is a continuation-application of International Application PCT/CN2021/131466, with an international filing date of Nov. 18, 2021, which claims foreign priority of Chinese Patent Application No. 202110846375.X, filed on Jul. 26, 2021 in the China National Intellectual Property Administration, the contents of all of which are hereby incorporated by reference.

BACKGROUND

1. Technical Field

The present disclosure generally relates to legged robots, and particularly to a method for controlling a legged robot, a legged robot, and a computer-readable storage medium.

2. Description of Related Art

When a legged robot (e.g., biped robot shown in FIG. 1) is walking up stairs or on an uneven ground with obstacles, if there is an error in the external sensory information or there is no external sensory information, one foot of the robot may tend to bump into a low obstacle, causing damage to the robot. In addition, the robot may suffer from the problem of tripping over low obstacles because of the error in the external sensory information.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
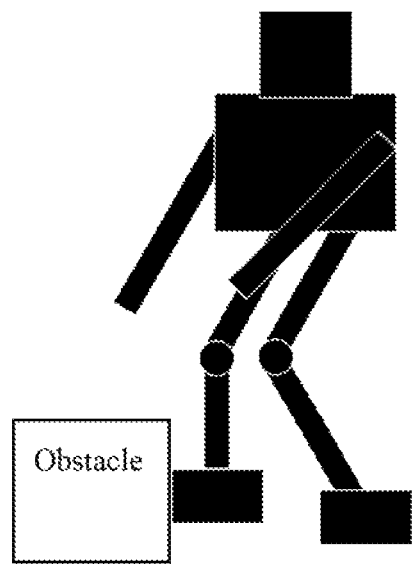
FIG. 1 is a schematic diagram of a biped robot whose foot colliding with an obstacle.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

For a legged robot such as biped robot, it has a double-leg support state and a single-leg support state during the whole walking process. When the biped robot is in the double-leg support state, both legs of the biped robot are used as supporting legs to support the biped robot to maintain a standing state. When the biped robot is in the single-leg support state, the foot of one leg of the robot is not in contact with the support surface (i.e., floor, ground, etc.) and the leg swings in the air. This leg can be referred to as a "swing leg." For example, when a legged robot walks on an uneven ground with obstacles or on the stairs, it may collide with the external environment, resulting in robot falling down or other problems due to the impact from the external environment.

The interaction between the swing leg of a legged robot and the external environment can usually be equivalent to a mass-damping-spring model, and its dynamic equation can be described as: $m(\ddot{X}_r - \ddot{X}_m) + b(\dot{X}_r - \dot{X}_m) + k(X_r - X_m) = f$, where m is the equivalent mass of the swinging leg, b is a preset parameter associated with velocity, k is a parameter of a proportional term, and f represents the external force received by the swinging leg; $\ddot{X}_r$, $\dot{X}_r$, and $X_r$ represent the reference acceleration, reference speed, and reference position, respectively; $\ddot{X}_m$, $\dot{X}_m$, and $X_m$ represent the measured actual acceleration, actual velocity, and actual position, respectively. It can be seen that when the external force is applied and the control is based on the above-mentioned mass-damping-spring model, the swinging leg will rebound and often collide with an obstacle again, which will cause damage to the robot itself or the external environment.

Figure 2:
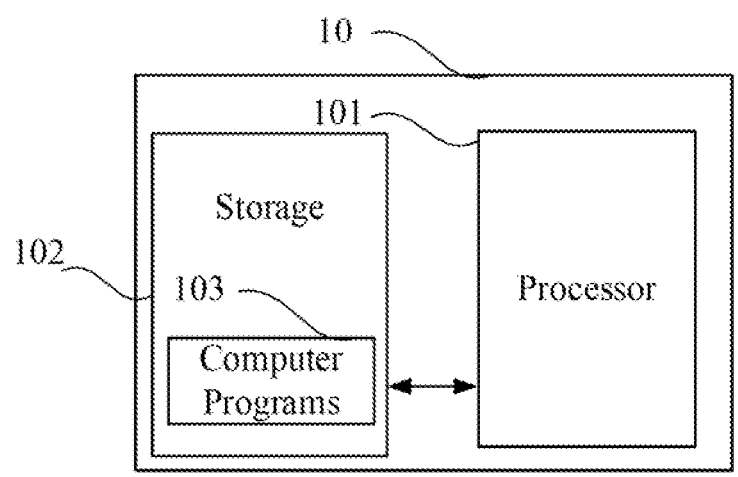
FIG. 2 is a schematic block diagram of a robot according to one embodiment.
Figure 3:
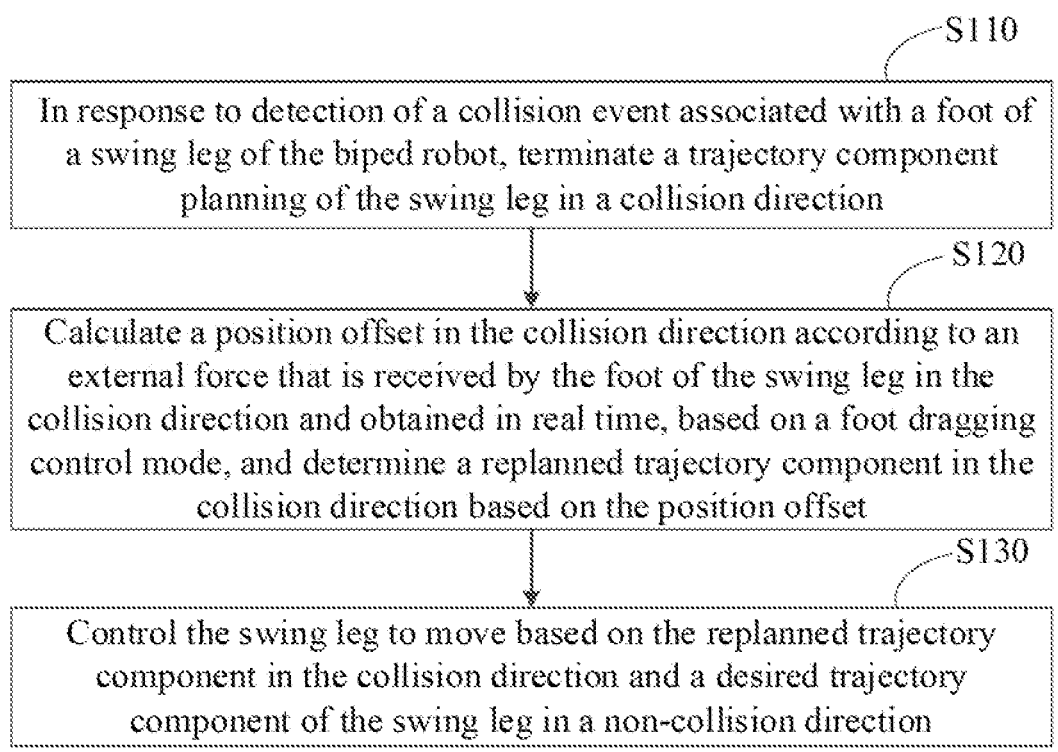
FIG. 3 is an exemplary flowchart of a method for controlling a legged robot according to one embodiment.

FIG. 2 shows a schematic block diagram of a legged robot 10 according to one embodiment. The robot 10 may include a processor 101, a storage 102, and one or more executable computer programs 103 that are stored in the storage 102. The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of the method for controlling the robot 10, such as steps S110 to S130 in FIG. 3, are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random access memory (RAM), a read only memory (ROM), a programmable read only memory (PROM), an erasable programmable read-only memory (EPROM), and an electrical erasable programmable read-only memory (EEPROM). The storage 102 may be an internal storage unit of the robot 10, such as a hard disk or a memory. The storage 102 may also be an external storage device of the robot 10, such as a plug-in hard disk, a smart memory card (SMC), and a secure digital (SD) card, or any suitable flash cards.

Furthermore, the storage 102 may also include both an internal storage unit and an external storage device. The storage 102 is used to store computer programs, other programs, and data required by the robot 10. The storage 102 can also be used to temporarily store data that have been output or is about to be output.

Figure 6:
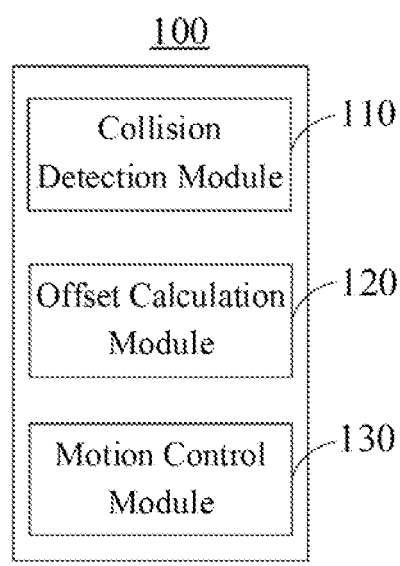
FIG. 6 is a schematic block diagram of a control device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot 10. For example, the one or more computer programs 103 may be divided into a collision detection module 110, an offset calculation module 120, and a motion control module 130 as shown in FIG. 6.

It should be noted that the block diagram shown in FIG. 2 is only an example of the robot 10. The robot 10 may include more or fewer components than what is shown in FIG. 2, or have a different configuration than what is shown in FIG. 2. Each component shown in FIG. 2 may be implemented in hardware, software, or a combination thereof.

The embodiments of this disclosure propose a method for controlling a legged robot. According to the embodiments, when the collision of a foot of the robot with an obstacle occurs, the desired planning of the swing leg in the direction of the collision is terminated immediately. A foot dragging control mode is then used to calculate a position offset in the collision direction to plan a new trajectory component in the collision direction. The trajectory of the swing leg is replanned based on the new trajectory component and a desired trajectory of the swing leg in the non-collision direction. The method can realize the stable operation of the robot through the drag mode control and trajectory replanning of the foot of the swinging leg, without falling or being damaged after the foot collides with an obstacle, thus ensuring the safety of the robot itself and the external environment.

Referring to FIG. 3, in one embodiment, a method for controlling a legged robot enable the legged robot to walk in different scenarios, such as going up stairs and walking on an uneven ground with obstacles, without falling or being damaged when a foot of the robot collides with an obstacle, thereby achieving the purpose of stable control.

In order to facilitate the motion control of the robot's swing leg, the planned trajectory of the robot's swing leg can be decomposed into three different directions. That is, the planning trajectory may include a trajectory component in the forward direction of a foot of the swing leg, a trajectory component in the lateral movement direction of the foot, and a trajectory component in the lifting direction of the foot. Based on the above-mentioned motion trajectories, the method for controlling the robot will be described below. In one embodiment, the method may include the following steps.

Step S110: In response to detection of a collision event associated with a foot of a swing leg of the biped robot, terminate a trajectory component planning of the swing leg in a collision direction. The trajectory component planning in the collision direction includes a trajectory component in a forward direction and a trajectory component in a lateral movement direction of a single-leg motion planning trajectory of the robot.

When the collision of a foot of the swing leg with an obstacle is detected, the planning of the current trajectory component of the swing leg in the collision direction will be terminated in order to prevent the swing leg from returning to the position where the collision occurs. As a result, the robot can be prevented from continuing to move the swing leg according to the original planning of the trajectory component, thereby avoiding causing more serious damage to the robot itself and the external environment.

In one embodiment, in order to realize the above-mentioned termination of planning control, it needs to keep the leg-lifting time of the swing leg at the moment of collision as $t\_max$, and use $t\_max$ instead of the leg-lifting time $t$ in the subsequent planning, which can realize the termination of the trajectory component planning of the swing leg in the collision direction. It can be understood that the pre-planned desired motion trajectory is only related to the leg-lifting time $t$, and when $t$ is set to a constant $t\_max$, the corresponding trajectory will also remain unchanged.

In one embodiment, when the foot of the swing leg collides with an obstacle in a certain direction, the trajectory component in the collision direction that needs to stop planning should be decomposed into trajectory components in the above-mentioned three directions. For example, in one embodiment, if the foot of the swing leg collides with an obstacle in the forward collision, the trajectory component in the collision direction is the trajectory component in the forward direction. If the foot of the swing leg collides with an obstacle obliquely, it is considered to have collision in both the forward direction and the lateral movement direction. In this case, the trajectory components in the collision direction are the trajectory component in the forward direction and the trajectory component in the lateral movement direction. It can be understood that the trajectory component in the collision direction mainly depends on actual circumstances of the collision between the robot and the external environment.

Figure 4:
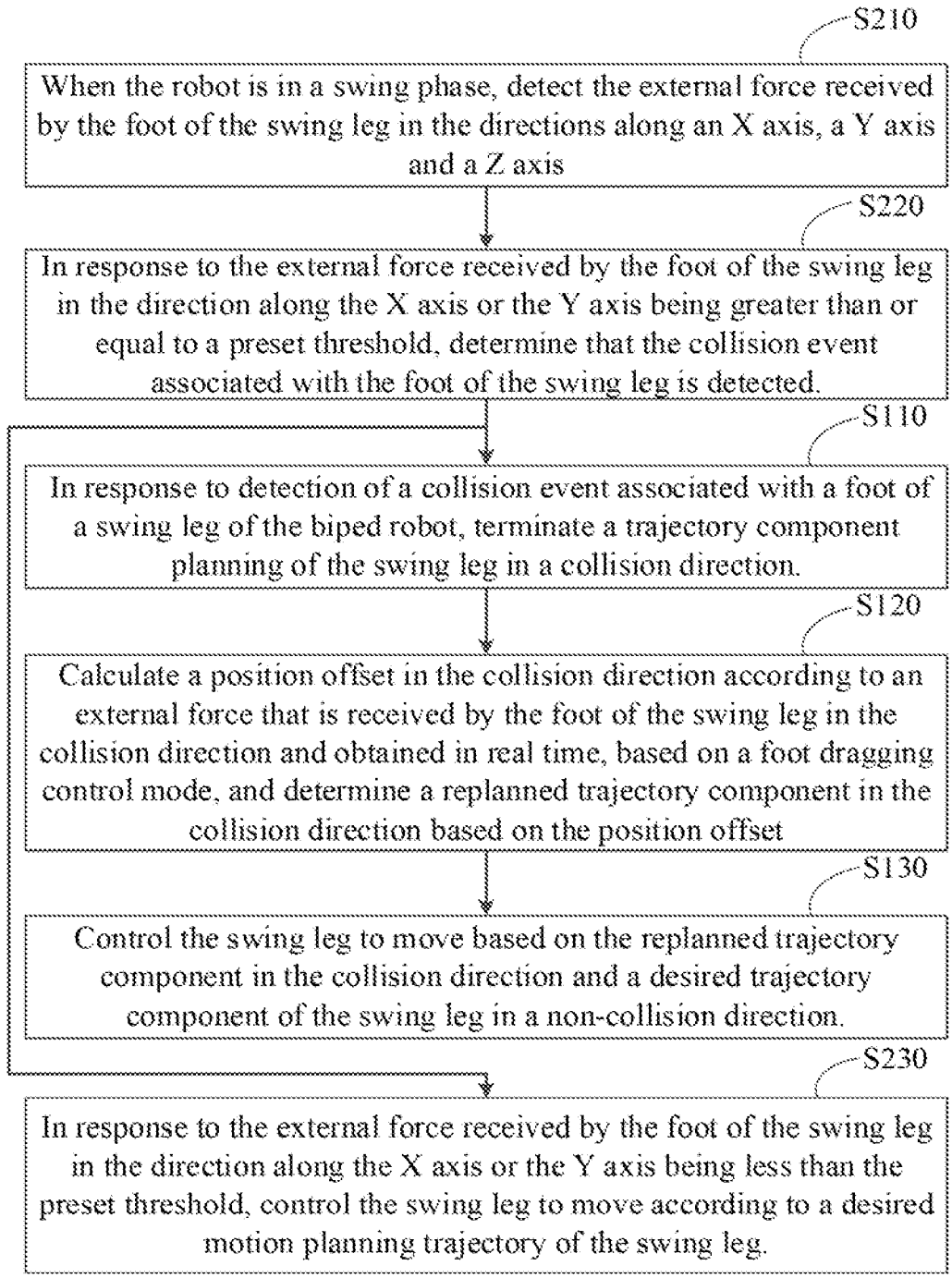
FIG. 4 is an exemplary flowchart of a method for controlling a legged robot according to another embodiment.

In one embodiment, before the step S110 above, the method may further include: when the robot is in a swing phase, detecting the collision situation of the swing leg of the robot in real time. Exemplarily, as shown in FIG. 4, the method may further include the following steps.

Step S210: When the robot is in a swing phase, detect the external force received by the foot of the swing leg in the directions along an X axis, a Y axis and a Z axis.

In one embodiment, the foot of each leg of the robot is provided with a force sensor to detect an external force. The above-mentioned force sensor is not limited to a six-dimensional force sensor. The six-dimensional force sensor can measure three-dimensional forces and three-dimensional moments. Here, the required three-dimensional force measurement result can be selected for processing according to requirements. In addition, the force sensor may be a force sensor for measuring only three-dimensional forces.

Figure 5:
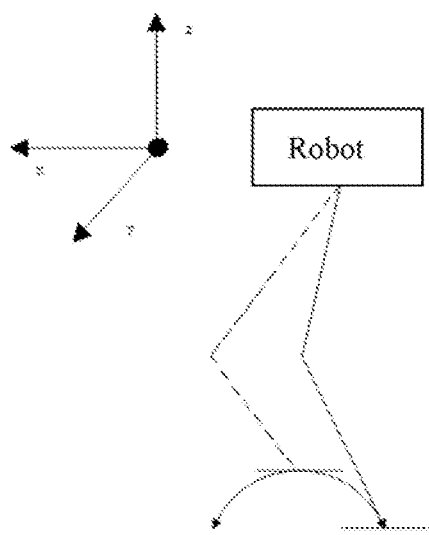
FIG. 5 is a schematic diagram of showing motion of a foot of the swing leg of a biped robot.

For the convenience of calculation, in one embodiment, the measurement coordinate system of the force sensor is set corresponding to the movement direction of the foot of the swing leg. Thus, the external forces in the three directions measured by the force sensor at the foot of the swing leg are directly used as the external forces received by the foot of the swing leg in the directions of the three motion trajectory components. For example, as shown in FIG. 5, the direction along an X axis in the three-dimensional space coordinate system of the force sensor corresponds to the direction in which the foot moves horizontally, the direction along a Y axis in the three-dimensional space coordinate system corresponds to the direction in which the foot end moves laterally, and the direction along a Y axis in the three-dimensional space coordinate system corresponds to the direction in which the foot end lifts up vertically.

Taking the six-dimensional force sensor as an example, for the above-mentioned step S210, when the legged robot walks normally and is in the swing phase, the external force received by the foot of the swing leg in the direction of each motion trajectory component can be detected in real time through the six-dimensional force sensor.

Step S220: In response to the external force received by the foot of the swing leg in the direction along the X axis or the Y axis being greater than or equal to a preset threshold, determine that the collision event associated with the foot of the swing leg is detected.

In one embodiment, a threshold value $F_{th}$ can be set in the preset measurement direction, and then it can be determined in real time whether the external force received in the measurement direction is greater than or equal to the threshold value. For example, if the force on the foot of the swing leg in the measurement direction is greater than or equal to the force threshold $F_{th}$, it is determined that the foot of the swing leg has collided with the external environment. Otherwise, if the force on the foot in the measuring direction is less than the force threshold $F_{th}$, it is determined that no collision has occurred, and the detection is continued.

The value of the above-mentioned threshold $F_{th}$ can be selected according to actual needs, and the thresholds in different measurement directions can be the same or different. For example, in one embodiment, the preset measurement direction may be the direction along the X axis or the Y axis. It can be understood that the preset measurement direction may be selected according to the actual external environment, and this is only an example.

Step S230: In response to the external force received by the foot of the swing leg in the direction along the X axis or the Y axis being less than the preset threshold, control the swing leg to move according to a desired motion planning trajectory of the swing leg.

In the case of no collision, the legged robot will walk normally according to the desired motion trajectories of the feet of the pre-planned swing leg and support leg. For example, in one embodiment, the desired motion planning trajectory of the swing leg is expressed as follows:

$$X_{x_2} = \frac{l_x}{2} - \frac{l_x}{2}\cos(\pi t/T);$$

$$X_{y_2} = \frac{l_y}{2} - \frac{l_y}{2}\cos(\pi t/T);$$

$$X_{z_2} = At^3 + Bt^2 + Ct + D;$$

wherein $X_{x_2}$, $X_{y_2}$ and $X_{z_2}$ represent trajectory components in the forward direction (i.e., motion trajectory in the direction along the X axis), the lateral movement direction (i.e., motion trajectory in the direction along the Y axis), and the lifting direction (i.e., motion trajectory in the direction along the Z axis); t is a leg raising time period; T is a total time period of the swing phase; $l_x$ is a desired forward step length of the swing leg; $l_y$ is a desired lateral step length of the swing leg; A, B, C and D are preset coefficients, which can be set according to actual needs.

Step S120: Calculate a position offset in the collision direction according to an external force that is received by the foot of the swing leg in the collision direction and obtained in real time, based on a foot dragging control mode, and determine a replanned trajectory component in the collision direction based on the position offset.

When the collision of the foot of the swing leg with an obstacle occurs, a new foot controller is provided to control the movement of the swinging leg. Considering that a position shift will occur due to the impact of the external force when the foot of the swing leg collides with an obstacle, the model of the interaction between the foot of the swinging leg and the external environment is designed as a drag control mode, so that the swing leg will not return to the position when the collision occurs after being subjected to an external collision force.

In one embodiment, the foot dragging control mode is expressed as follows: $b(\dot{X}_r - \dot{X}_m) = F$, where $\dot{X}_r$ and $\dot{X}_m$ respectively represent a reference speed and a measured actual speed of the robot; b is a preset parameter; F is the external force received by the foot of the swing leg.

In one embodiment, integral transformation can be performed on the foot dragging control mode to obtain a position offset calculation equation. The position offset calculation equation is as follows: $\Delta X = F \cdot t_0/b$, where $\Delta X$ represents the position offset; $t_0$ represents a program control cycle for the robot.

Therefore, a new trajectory component of the swing leg in the collision direction can be planned and obtained according to the position offset of the swing leg in the collision direction in each control cycle.

Taking the collision direction as the forward direction as an example, if the external force on the foot of the swinging leg in the forward direction is denoted as Fx, after it is substituted into the position offset calculation equation, the position offset $\Delta X_x$ in the forward direction can be obtained. The same goes for other motion directions.

Still taking the collision direction as the forward direction as an example, the new trajectory component of the swing leg in the collision direction can be expressed as follows: $X_{x1}^{(t)} = X_{x1}^{(t-1)} + \Delta X_x$, where $X_{x1}^{(t)}$ and $X_{x1}^{(t-1)}$ represent positions of the swing leg at time t−1 and time t in the forward direction, respectively; $\Delta X_x$ represents the position offset calculated in real time in the forward direction.

If the collision direction is another direction of motion, such as the lateral movement direction, the new trajectory component in the lateral movement direction is as follows: $X_{y1}^{(t)} = X_{y1}^{(t-1)} + \Delta X_y$, where $X_{y1}^{(t)}$ and $X_{y1}^{(t-1)}$ represent positions of the swing leg at time t−1 and time t in the lateral movement direction, respectively; $\Delta X_y$ represents the position offset calculated in real time in the lateral movement direction.

If the collision direction is an oblique collision direction, the trajectory component in the collision direction in this case includes the trajectory component in the forward direction and the trajectory component in the lateral movement direction. Then, the new trajectory component of the swing leg in the collision direction can be expressed as follows: $X_{x1}^{(t)} = X_{x1}^{(t-1)} + \Delta X_x$ and $X_{y1}^{(t)} = X_{y1}^{(t-1)} + \Delta X_y$.

For the step S120, the external force on the foot of the swing leg in the collision direction obtained in real time can be substituted into the above-mentioned position offset calculation equation, the position offset of the corresponding trajectory component can be obtained. Then, based on the position at the previous moment, the current planning trajectory component can be obtained.

Step S130: Control the swing leg to move based on the replanned trajectory component in the collision direction and a desired trajectory component of the swing leg in a non-collision direction.

According to the replanned trajectory component of the swing leg in the collision direction and the desired trajectory component in the non-collision direction, the motion trajectory of the swing leg will be replanned to change the trajectory of the swing leg. This prevents the robot from colliding with an obstacle and returning to the collided position again. The desired trajectory component of the swing leg in the non-collision direction means that the foot of the swing leg will move according to its original desired trajectory component in the non-collision direction.

In one embodiment where the collision direction is the forward direction, the trajectory component in the collision direction is the forward direction trajectory component, and the desired trajectory component in the non-collision direction is the original trajectory component in the lateral movement direction and the lifting direction. For example, taking the above-mentioned desired trajectory planning in the lateral movement direction and lifting direction as an example, the motion trajectory of the swinging leg can be expressed as follows:

$$\begin{cases} X_{x1}^{(t)} = X_{x1}^{(t-1)} + \Delta X_x \\ X_{y2} = \frac{l_y}{2} - \frac{l_y}{2}\cos(\pi t/T) \\ X_{z_2} = At^3 + Bt^2 + Ct + D \end{cases}$$

In another embodiment where the trajectory component in the collision direction includes the trajectory component in the forward direction and the trajectory component in the lateral movement direction, the swing leg will move according to the following trajectory that is described as follows:

$$\begin{cases} X_{x1}^{(t)} = X_{x1}^{(t-1)} + \Delta X_x \\ X_{y1}^{(t)} = X_{y1}^{(t-1)} + \Delta X_y \\ X_{z_2} = At^3 + Bt^2 + Ct + D \end{cases}$$

It can be understood that the designed foot dragging mode is used to calculate the position offset of the swing leg in the collision direction, which can change the trajectory of the swing leg. Thus, after the foot of the swing leg collides with an obstacle, the swing leg will not return to the initial position where the collision occurs, thus avoiding another collision.

According to the embodiments of the present disclosure, by dragging the foot of the swing leg and replanning the trajectory, the robot can operate stably without falling or being damaged after the collision of the foot of the swing leg with an obstacle, thus ensuring the safety of the robot itself and the external environment.

Referring to FIG. 6, in one embodiment, a control device 100 for controlling a legged robot is provided. The single-leg motion planning trajectory of the robot includes the trajectory component in the forward direction of the foot, the trajectory component in the lateral movement direction and the trajectory component in the lifting direction.

In one embodiment, the device 100 may include a collision detection module 110, an offset calculation module 120, and a motion control module 130. The collision detection module 110 is to, in response to detection of a collision event associated with a foot of a swing leg of the biped robot, terminate a trajectory component planning of the swing leg in a collision direction. The trajectory component planning in the collision direction includes a trajectory component in a forward direction and a trajectory component in a lateral movement direction of a single-leg motion planning trajectory of the robot.

The offset calculation module 120 is to calculate a position offset in the collision direction according to an external force that is received by the foot of the swing leg in the collision direction and obtained in real time, based on a foot dragging control mode, and determine a replanned trajectory component in the collision direction based on the position offset.

The motion control module 130 is to control the swing leg to move based on the replanned trajectory component in the collision direction and a desired trajectory component of the swing leg in a non-collision direction.

It should be noted that the basic principles and technical effects of the device 100 are the same as the aforementioned method. For a brief description, for parts not mentioned in this device embodiment, reference can be made to corresponding description in the method embodiments.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented method for controlling a legged robot, comprising:
in response to detection of a collision event associated with a foot of a swing leg of the biped robot, terminating a trajectory component planning of the swing leg in a collision direction, wherein the trajectory component planning in the collision direction comprises a trajectory component in a forward direction and a trajectory component in a lateral movement direction of a single-leg motion planning trajectory of the robot;
calculating a position offset in the collision direction according to an external force that is received by the foot of the swing leg in the collision direction and obtained in real time, based on a foot dragging control mode, and determining a replanned trajectory component in the collision direction based on the position offset; and
controlling the swing leg to move based on the replanned trajectory component in the collision direction and a desired trajectory component of the swing leg in a non-collision direction.

2. The method of claim 1, wherein calculating the position offset in the collision direction comprises:
performing integral transformation on the foot dragging control mode to obtain a position offset calculation equation, wherein the position offset calculation equation is configured to calculate the position offset in a direction of a corresponding trajectory component according to the external force received by the foot of the swing leg in the direction of the corresponding trajectory component.

3. The method of claim 2, wherein the foot dragging control mode is expressed as follows: $b(\dot{X}_r - \dot{X}_m) = F$, where $\dot{X}_r$ and $\dot{X}_m$ respectively represent a reference speed and a measured actual speed of the robot; b is a preset parameter; F is the external force received by the foot of the swing leg; the position offset calculation equation is as follows: $\Delta X = F \cdot t_0 / b$, where $\Delta X$ represents the position offset; $t_0$ represents a program control cycle for the robot.

4. The method of claim 1, wherein when the trajectory component planning in the collision direction is the trajectory component in a forward direction and/or the trajectory component in a lateral movement direction, the position offset in the collision direction comprises a position offset in the forward direction and/or a position offset in the lateral movement direction; replanned trajectory components of the swing leg in the forward direction and the lateral movement direction are as follows: $X_{x1}^{(t)} = X_{x1}^{(t-1)} + \Delta X_x$ and $X_{y1}^{(t)} = X_{y1}^{(t-1)} + \Delta X_y$, where $X_{x1}^{(t)}$ and $X_{x1}^{(t-1)}$ represent positions of the swing leg at time t−1 and time t in the forward direction, respectively; $X_{y1}^{(t)}$ and $X_{y1}^{(t-1)}$ represent positions of the swing leg at time t−1 and time t in the lateral movement direction, respectively; $\Delta X_x$ and $\Delta X_y$ represent the position offsets calculated in real time in the forward direction and the lateral movement direction, respectively.

5. The method of claim 1, wherein the foot of the robot is provided with a force sensor, and directions along an X axis, a Y axis and a Z axis in a coordinate system of the force sensor correspond to the forward direction, the lateral movement direction and a lifting direction respectively; the detection of the collision event associated with the foot of the swing leg comprises:

when the robot is in a swing phase, detecting the external force received by the foot of the swing leg in the directions along the X axis, the Y axis and the Z axis using the force sensor; and
in response to the external force received by the foot of the swing leg in the direction along the X axis or the Y axis being greater than or equal to a preset threshold, determining that the collision event associated with the foot of the swing leg is detected.

6. The method of claim 5, further comprising:
in response to the external force received by the foot of the swing leg in the direction along the X axis or the Y axis being less than the preset threshold, controlling the swing leg to move according to a desired motion planning trajectory of the swing leg.

7. The method of claim 6, where the desired motion planning trajectory of the swing leg is expressed as follows:

$$X_{x_2} = \frac{l_x}{2} - \frac{l_x}{2}\cos(\pi t/T);$$
$$X_{y_2} = \frac{l_y}{2} - \frac{l_y}{2}\cos(\pi t/T);$$
$$X_{z_2} = At^3 + Bt^2 + Ct + D;$$

wherein $X_{x_2}$, $X_{y_2}$ and $X_{z_2}$ represent trajectory components in the forward direction, the lateral movement direction, and the lifting direction; t is a leg raising time period; T is a total time period of the swing phase; $l_x$ is a desired forward step length of the swing leg; $l_y$ is a desired lateral step length of the swing leg; A, B, C and D are preset coefficients.

8. A legged robot comprising:
one or more processors; and
a memory coupled to the one or more processors, the memory storing programs that, when executed by the one or more processors, cause performance of operations comprising:
in response to detection of a collision event associated with a foot of a swing leg of the biped robot, terminating a trajectory component planning of the swing leg in a collision direction, wherein the trajectory component planning in the collision direction comprises a trajectory component in a forward direction and a trajectory component in a lateral movement direction of a single-leg motion planning trajectory of the robot;
calculating a position offset in the collision direction according to an external force that is received by the foot of the swing leg in the collision direction and obtained in real time, based on a foot dragging control mode, and determining a replanned trajectory component in the collision direction based on the position offset; and
controlling the swing leg to move based on the replanned trajectory component in the collision direction and a desired trajectory component of the swing leg in a non-collision direction.

9. The legged robot of claim 8, wherein calculating the position offset in the collision direction comprises:
performing integral transformation on the foot dragging control mode to obtain a position offset calculation equation, wherein the position offset calculation equation is configured to calculate the position offset in a direction of a corresponding trajectory component according to the external force received by the foot of the swing leg in the direction of the corresponding trajectory component.

10. The legged robot of claim 9, wherein the foot dragging control mode is expressed as follows: $b(\dot{X}_r - \dot{X}_m) = F$, where $\dot{X}_r$ and $\dot{X}_m$ respectively represent a reference speed and a measured actual speed of the robot; b is a preset parameter; F is the external force received by the foot of the swing leg; the position offset calculation equation is as follows: $\Delta X = F \cdot t_0/b$, where $\Delta X$ represents the position offset; $t_0$ represents a program control cycle for the robot.

11. The legged robot of claim 8, wherein when the trajectory component planning in the collision direction is the trajectory component in a forward direction and/or the trajectory component in a lateral movement direction, the position offset in the collision direction comprises a position offset in the forward direction and/or a position offset in the lateral movement direction; replanned trajectory components of the swing leg in the forward direction and the lateral movement direction are as follows: $X_{x1}^{(t)} = X_{x1}^{(t-1)} + \Delta X_x$ and $X_{y1}^{(t)} = X_{y1}^{(t-1)} + \Delta X_y$ where $X_{x1}^{(t)}$ and $X_{x1}^{(t-1)}$ represent positions of the swing leg at time t−1 and time t in the forward direction, respectively; $X_{y1}^{(t)}$ and $X_{y1}^{(t-1)}$ represent positions of the swing leg at time t−1 and time t in the lateral movement direction, respectively; $\Delta X_x$ and $\Delta X_y$ represent the position offsets calculated in real time in the forward direction and the lateral movement direction, respectively.

12. The legged robot of claim 8, wherein the foot of the robot is provided with a force sensor, and directions along an X axis, a Y axis and a Z axis in a coordinate system of the force sensor correspond to the forward direction, the lateral movement direction and a lifting direction respectively; the detection of the collision event associated with the foot of the swing leg comprises:
   when the robot is in a swing phase, detecting the external force received by the foot of the swing leg in the directions along the X axis, the Y axis and the Z axis using the force sensor; and
   in response to the external force received by the foot of the swing leg in the direction along the X axis or the Y axis being greater than or equal to a preset threshold, determining that the collision event associated with the foot of the swing leg is detected.

13. The legged robot of claim 12, further comprising:
   in response to the external force received by the foot of the swing leg in the direction along the X axis or the Y axis being less than the preset threshold, controlling the swing leg to move according to a desired motion planning trajectory of the swing leg.

14. The legged robot of claim 13, where the desired motion planning trajectory of the swing leg is expressed as follows:

$$X_{x_2} = \frac{l_x}{2} - \frac{l_x}{2}\cos(\pi t/T);$$

$$X_{y_2} = \frac{l_y}{2} - \frac{l_y}{2}\cos(\pi t/T);$$

$$X_{z_2} = At^3 + Bt^2 + Ct + D;$$

wherein $X_{x_2}$, $X_{y_2}$ and $X_{z_2}$ represent trajectory components in the forward direction, the lateral movement direction, and the lifting direction; t is a leg raising time period; T is a total time period of the swing phase; $l_x$ is a desired forward step length of the swing leg; $l_y$ is a desired lateral step length of the swing leg; A, B, C and D are preset coefficients.

15. A non-transitory computer-readable storage medium storing instructions that, when executed by at least one processor of a legged robot, cause the at least one processor to perform a method, the method comprising:
   in response to detection of a collision event associated with a foot of a swing leg of the biped robot, terminating a trajectory component planning of the swing leg in a collision direction, wherein the trajectory component planning in the collision direction comprises a trajectory component in a forward direction and a trajectory component in a lateral movement direction of a single-leg motion planning trajectory of the robot;
   calculating a position offset in the collision direction according to an external force that is received by the foot of the swing leg in the collision direction and obtained in real time, based on a foot dragging control mode, and determining a replanned trajectory component in the collision direction based on the position offset; and
   controlling the swing leg to move based on the replanned trajectory component in the collision direction and a desired trajectory component of the swing leg in a non-collision direction.

16. The non-transitory computer-readable storage medium of claim 15, wherein calculating the position offset in the collision direction comprises:
   performing integral transformation on the foot dragging control mode to obtain a position offset calculation equation, wherein the position offset calculation equation is configured to calculate the position offset in a direction of a corresponding trajectory component according to the external force received by the foot of the swing leg in the direction of the corresponding trajectory component.

17. The non-transitory computer-readable storage medium of claim 16, wherein the foot dragging control mode is expressed as follows: $b(\dot{X}_r - \dot{X}_m) = F$, where $\dot{X}_r$ and $\dot{X}_m$ respectively represent a reference speed and a measured actual speed of the robot; b is a preset parameter; F is the external force received by the foot of the swing leg; the position offset calculation equation is as follows: $\Delta X = F \cdot t_0/b$, where $\Delta X$ represents the position offset; $t_0$ represents a program control cycle for the robot.

18. The non-transitory computer-readable storage medium of claim 15, wherein when the trajectory component planning in the collision direction is the trajectory component in a forward direction and/or the trajectory component in a lateral movement direction, the position offset in the collision direction comprises a position offset in the forward direction and/or a position offset in the lateral movement direction; replanned trajectory components of the swing leg in the forward direction and the lateral movement direction are as follows: $X_{x1}^{(t)} = X_{x1}^{(t-1)} + \Delta X_x$ and $X_{y1}^{(t)} = X_{y1}^{(t-1)} + \Delta X_y$ where $X_{x1}^{(t)}$ and $X_{x1}^{(t-1)}$ represent positions of the swing leg at time t−1 and time t in the forward direction, respectively; $X_{y1}^{(t)}$ and $X_{y1}^{(t-1)}$ represent positions of the swing leg at time t−1 and time t in the lateral movement direction, respectively: $\Delta X_x$ and $\Delta X_y$ represent the position offsets calculated in real time in the forward direction and the lateral movement direction, respectively.

19. The non-transitory computer-readable storage medium of claim 15, wherein the foot of the robot is provided with a force sensor, and directions along an X axis, a Y axis and a Z axis in a coordinate system of the force sensor correspond to the forward direction, the lateral movement direction and a lifting direction respectively; the detection of the collision event associated with the foot of the swing leg comprises:
- when the robot is in a swing phase, detecting the external force received by the foot of the swing leg in the directions along the X axis, the Y axis and the Z axis using the force sensor; and
- in response to the external force received by the foot of the swing leg in the direction along the X axis or the Y axis being greater than or equal to a preset threshold, determining that the collision event associated with the foot of the swing leg is detected.

20. The non-transitory computer-readable storage medium of claim 19, wherein the method further comprises:
- in response to the external force received by the foot of the swing leg in the direction along the X axis or the Y axis being less than the preset threshold, controlling the swing leg to move according to a desired motion planning trajectory of the swing leg.

* * * * *